(12) United States Patent
Chang et al.

(10) Patent No.: US 9,580,639 B2
(45) Date of Patent: Feb. 28, 2017

(54) CONTROLLED RELEASE OF SURFACTANTS FOR ENHANCED OIL RECOVERY

(71) Applicant: Saudi Arabian Oil Company, Dhahran (SA)

(72) Inventors: Yun Chea Chang, Dhahran (SA); Mazen Y. Kanj, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 82 days.

(21) Appl. No.: 14/043,403

(22) Filed: Oct. 1, 2013

(65) Prior Publication Data
US 2014/0031265 A1 Jan. 30, 2014

Related U.S. Application Data

(63) Continuation-in-part of application No. 13/184,974, filed on Jul. 18, 2011, now Pat. No. 8,946,132.

(51) Int. Cl.
C09K 8/584 (2006.01)
C09K 8/588 (2006.01)

(52) U.S. Cl.
CPC .............. *C09K 8/584* (2013.01); *C09K 8/588* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 3,580,337 | A | 5/1971 | Gogarty et al. |
| 3,638,728 | A | 2/1972 | Hill |
| 3,730,273 | A | 5/1973 | Wilson |
| 3,939,911 | A | 2/1976 | Maddox, Jr. et al. |
| 4,167,464 | A * | 9/1979 | George ................. 523/300 |
| 4,319,636 | A * | 3/1982 | Kudchadker .......... C09K 8/584 166/270.1 |
| 4,394,213 | A | 7/1983 | Ferm |
| 4,504,399 | A | 3/1985 | Stapp |
| 4,609,474 | A | 9/1986 | Reisburg et al. |
| 4,702,319 | A | 10/1987 | Bock et al. |
| 4,733,728 | A | 3/1988 | Morita et al. |
| 4,769,162 | A | 9/1988 | Remus |
| 5,662,168 | A | 9/1997 | Smith |
| 6,495,500 | B1 | 12/2002 | Connors et al. |
| 7,271,133 | B2 | 9/2007 | Weaver et al. |
| 2003/0204014 | A1 * | 10/2003 | Yeung et al. ............ 524/558 |
| 2005/0065040 | A1 | 3/2005 | Weaver |
| 2006/0180308 | A1 | 8/2006 | Welton et al. |
| 2008/0257551 | A1 | 10/2008 | Morris |
| 2010/0048432 | A1 | 2/2010 | Costello et al. |
| 2010/0282467 | A1 | 11/2010 | Hutchison et al. |

FOREIGN PATENT DOCUMENTS

| | | |
|---|---|---|
| CN | 1442260 A * | 9/2003 |
| DE | 3049205 A1 | 1/1982 |
| EP | 1422286 A1 | 5/2004 |
| WO | 2009058889 | 5/2009 |
| WO | 2013/012607 A1 | 1/2013 |

OTHER PUBLICATIONS

Chunyan et al., EPO machine translation of CN1442260, Sep. 2003.*
PCT Partial International Search Report; dated Feb. 27, 2015; International Application No. PCT/US2014/057169; International File Date: Sep. 24, 2014.
Nathan, A., et al.; Copolymers of Lysine and Polyethylene Glycol; A New Family of Functionalized Drug Carriers; Bioconjugate Chemistry; Jan. 1, 1993; vol. 4; pp. 54-62; American Cancer Society.
International Search Report & Written Opinion (PCT/US2012/046034), dated Oct. 23, 2012.
Johnson, Stephen, et al., Effects of Divalent Cations, Seawater, and Formation Brine on Positively Charged Polyethylenimine/Dextran Sulfate/Chromium (III) Polyelectrolyte Complexes and Partially Hydrolyzed Polyacrylamide/Chromium (III) Gelation, Journal of Applied Polymer Science, 2010, pp. 1008-1014, vol. 115, Wiley Periodicals, Inc., US.
Shupe et al., "Thermal Stability and Degradation Mechanism of Alkylbenzene Sulfonates in Alkaline Media", 145 (1) J. Colloid & Interface Sci. (1991), pp. 235-254.
PCT International Search Report and the Written Opinion; dated May 6, 2015; International Application No. PCT/US2014/057169; International File Date: Sep. 24, 2014.

* cited by examiner

*Primary Examiner* — Jeffrey Washville
(74) *Attorney, Agent, or Firm* — Bracewell LLP; Constance Gall Rhebergen

(57) ABSTRACT

A sparingly soluble sulfonate-metal salt particle includes the metal ion salt of an alkyl aryl sulfonate, the metal ion salt of a petroleum sulfonate and a hydrophobically modified hydrophilic polymer, and has an average particle size diameter in a range of from about 50 nm to about 450 nm and is sparingly soluble in water at room temperature. A method of producing a sparingly soluble sulfonate-metal salt particle includes the steps of introducing an aqueous solution containing a metal ion salt into a reactor, introducing an aqueous solution containing a sulfonate surfactant and a polymer into the reactor, and operating the reactor such that the sparingly soluble sulfonate-metal salt particle forms from the interaction of the metal ion from the salt, the sulfonate surfactant and the polymer.

13 Claims, No Drawings

CONTROLLED RELEASE OF SURFACTANTS FOR ENHANCED OIL RECOVERY

CROSS-REFERENCE TO RELATED PATENT APPLICATIONS

This application is a continuation-in-part of U.S. patent application Ser. No. 13/184,974, filed Jul. 18, 2011. For purposes of United States patent practice, this application incorporates the contents of the prior Application by reference in its entirety.

BACKGROUND OF THE INVENTION

1. Field of the Invention

The field of invention relates to compositions, delivery systems, and methods suitable for the enhanced oil recovery process.

2. Description of the Related Art

Surfactants are used in enhanced oil recovery (EOR) processes. The presence of a surfactant at the water/oil interface facilitates oil recovery.

Conventional methods feed surfactant solution into the reservoir directly to maximize the surfactant dose. The active surfactant is readily consumed at the oil-water interface. Surfactants and other chemicals are mixed with water and driven into the reservoir.

Significant amount of surfactant is lost due to adsorption to the rock of the formation before it has a chance to encounter residual oil. Often, surfactant molecules, especially anionic surfactants, adsorb into the rock before it interacts with oil. Adsorption of the surfactant into the formation results in a reduction in the effective amount of surfactant useful for mobilizing the oil. The adsorption problem worsens when anionic surfactants encounter carbonate rock, which acts as a Lewis acid. The extent of surfactant adsorption depends on the type of rock, pore surface area, water salinity and the type of surfactant. In general, roughly one milligram of surfactant adsorbs into one gram of rock. In addition to adsorption, some surfactants precipitate from the saline water with cations from the rock. In either case, some surfactants are lost before they have a chance to solubilize oil.

To overcome the adsorption and precipitation problems, increasing the amount of surfactants in water allows for the extra surfactants to be absorbed by the rock and still deliver remaining surfactants to the oil/water interface. However, the additional surfactant cost is prohibitive. Others use sacrificial chemicals to passivate the rock surface such that surfactant adsorption is mitigated before application.

When a slug of surfactant mixed in a polymer solution is introduced into the reservoir, the surfactant quickly deposits and, depending on the amount used, may be saturated on the oil-water interface. The oil, thus solubilized by the surfactant, can be recovered. Unfortunately, residual oil that lies behind the initial oil-water interface has less a chance of interacting with the surfactant and may remain immobilized.

Overall, the approaches fail to maintain a constant concentration of surfactant over an extended period in the formation. It would be ideal to have a sustained and constant concentration of free surfactant at the water/oil interface to prolong and improve oil recovery while avoiding adsorption into the formation.

SUMMARY OF THE INVENTION

One embodiment of the invention is a composition for the controlled release of surfactants in oil recovery operation, the composition being made of an aqueous sulfonate solution and a metal salt selected from aluminium nitrate nonahydrate, calcium chloride dehydrate, magnesium chloride hexahydrate, cobalt chloride hexahydrate, and other metal salts, wherein the mean diameter of the formed sparingly soluble sulfonate surfactant-metal salt particle is between 20 nm and 100 nm and solubility of the sparingly soluble sulfonate surfactant-metal salt particle is less than 100 ppm at room temperature. In another embodiment, the sparingly soluble sulfonate surfactant-metal salt particle additionally contains hydrolyzed polyacrylamide.

Another embodiment of the invention is a hydrocarbon recovery composition comprising a composition which comprises an aqueous sulfonate solution and a metal salt selected from aluminium nitrate nonahydrate, calcium chloride dehydrate, magnesium chloride hexahydrate, cobalt chloride hexahydrate, and other metal salts, wherein the mean diameter of the formed sparingly soluble sulfonate surfactant-metal salt particle is between 20 nm and 100 nm and solubility of the sparingly soluble sulfonate surfactant-metal salt particle is less than 100 ppm at room temperature. In another embodiment, the sparingly soluble sulfonate surfactant-metal salt particle additionally contains hydrolyzed polyacrylamide.

Another embodiment of the invention is a delivery system for controlling the release of surfactants in hydrocarbon recovery operation, the delivery system comprising an aqueous sulfonate solution and a salt selected from aluminium nitrate nonahydrate, calcium chloride dehydrate, magnesium chloride hexahydrate, cobalt chloride hexahydrate, and other metal salts, wherein the mean diameter of the formed sparingly soluble sulfonate surfactant-metal salt particle is between 20 nm and 100 nm and solubility of the sparingly soluble sulfonate surfactant-metal salt particle less than 100 ppm at room temperature; in an amount operable such that the sulfonate in the aqueous solution reduces surface tension of the hydrocarbon so that oil recovery is increased. In another embodiment, the sparingly soluble sulfonate surfactant-metal salt particle further contains hydrolyzed polyacrylamide.

Another embodiment of the invention is a method of delivering a controlled release of surfactants composition, the method including the following the steps, such as: (1) delivering an aqueous solution into a reservoir, the aqueous solution containing an aqueous sulfonate solution; and a metal salt selected from aluminium nitrate nonahydrate, calcium chloride dehydrate, magnesium chloride hexahydrate, cobalt chloride hexahydrate, and other metal salts; wherein the mean diameter of the formed sparingly soluble sulfonate surfactant-metal salt particle is between 20 nm and 100 nm and solubility of the sparingly soluble sulfonate surfactant-metal salt particle is less than 100 ppm at room temperature; and (2) delivering water to the reservoir.

Another embodiment of the invention is a method of treating a hydrocarbon containing formation by (a) providing a hydrocarbon recovery composition to at least a portion of the hydrocarbon containing formation, wherein the hydrocarbon recovery composition comprises (1) an aqueous sulfonate solution and (2) a metal salt selected from aluminium nitrate nonahydrate, calcium chloride dehydrate, magnesium chloride hexahydrate, cobalt chloride hexahydrate, and other metal salts; wherein the mean diameter of the sparingly soluble sulfonate surfactant-metal salt particle is between 20 nm and 100 nm and solubility of the sparingly soluble sulfonate surfactant-metal salt particle is less than 100 ppm at room temperature; and (b) allowing the hydrocarbon recovery composition to interact with hydrocarbons in the hydrocarbon containing formation.

A method of producing a sparingly soluble sulfonate surfactant-metal salt particle includes the steps of introducing an aqueous solution containing a metal ion salt into a reactor. The method includes introducing an aqueous solution containing a sulfonate surfactant and a polymer into the reactor. The method includes operating the reactor such that the sulfonate surfactant-metal salt particle forms from the interaction of the metal ion from the salt, the sulfonate surfactant and the polymer. The sulfonate surfactant-metal salt particle has an average particle size diameter in a range of from about 50 nm to about 450 nm and is sparingly soluble in water at room temperature.

A sparingly soluble sulfonate surfactant-metal salt particle includes a metal ion salt of an alkyl aryl sulfonate, a metal ion salt of a petroleum sulfonate and a hydrophobically modified hydrophilic polymer. The sulfonate surfactant-metal salt particle has an average particle size diameter in a range of from about 50 nm to about 450 nm and is sparingly soluble in water at room temperature.

Anionic surfactants can form salts some cations in situ. Salt formation is considered problematic and undesirable during enhanced oil recovery (EOR) since the formation of surfactant salts with ions present in the water or the rock results in the immediate loss of surfactants for extracting hydrocarbons. However, surfactant-metal salts can be engineered and used in such ways as to contribute to the EOR process for the long-term.

There are a number of technical hurdles to overcome for forming a sparingly soluble surfactant-metal salt that is useful for EOR processes. For example, the sparingly soluble surfactant-metal salt particles or capsules should be small—200 nm or less. This permits the surfactant-metal salt particles to travel into the formation and through the pores in the reservoir. The surfactant-metal salt particle size can be manipulated by controlling the nucleation rate for the precipitation of the particles. Another way to manipulate the particle size is to use a mechanical milling device to grind down larger particles. In addition, nano-sized particles have to be dispersible within in the reservoir environment conditions, that is, up to 100° C. and with 25 wt. % salinity of aqueous solution.

In the pharmaceutical and other industries, active ingredients are often delivered to a targeted area in a controlled release fashion such that one dose of active ingredient can sustain efficacy for a longer period. We intend to apply similar techniques to the delivery of surfactants. Ideally, surfactants will be delivered in a controlled manner and released at the oil/water interface. The delivered salt particle is akin to micro reservoirs of surfactant that feed the surfactant molecules to the oil/water interface at a constant concentration and a constant rate. As a result, residual oil at the treatment site is continually solubilized.

Anionic surfactants, such as sulfonates, are converted into surfactant-metal salt particles. The surfactant has a negative charge which reacts with the positively charged cations. Depending on the nature of surfactant anions and metal cations, some of the resulting surfactant salts are partially or sparingly soluble in water. The sparingly soluble surfactant-metal salts, being only slightly soluble in water, supply surfactant at a limited and controlled rate given the surfactant concentration in the water. This provides a continuous, low level of surfactant concentration at the oil/water interface of the treatment site for extended periods.

The sparingly soluble surfactant-metal salt nanoparticles can supply a constant flux of surfactant molecules into the surfactant solution. Because of this sustained supply of fresh surfactant molecules, more residual oil may be recovered over a period of time. The invention provides colloidal surfactant salts that maintain a constant free surfactant concentration in the surfactant solution. Because of this constant and sustained supply of fresh surfactant molecules more residual oil may be recovered.

DETAILED DESCRIPTION OF THE PREFERRED EMBODIMENTS

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Operable" and its various forms means fit for its proper functioning and able to be used for its intended use.

Where the Specification or the appended Claims provide a range of values, it is understood that the interval encompasses each intervening value between the upper limit and the lower limit as well as the upper limit and the lower limit. The invention encompasses and bounds smaller ranges of the interval subject to any specific exclusion provided.

Where the Specification and appended Claims reference a method comprising two or more defined steps, the defined steps can be carried out in any order or simultaneously except where the context excludes that possibility.

When a patent or a publication is referenced in this disclosure, the reference is incorporated by reference and in its entirety to the extent that it does not contradict statements made in this disclosure.

Sparingly Soluble Sulfonate-Metal Salts

The compositions and delivery systems disclosed provide a means to slowly release sulfonate surfactant in an aqueous solution, maintain the local sulfonate surfactant concentration at a constant level, and sustain the release of the sulfonate surfactant over a long period. The rock in a reservoir is porous with a wide pore size distribution. Pores can be as small as 1 micron and as large as 20 micron. A particle is a discrete entity of solid matter in a dispersed state with a diameter at or less than about 50 micrometers (50 μm). Larger size particles could be trapped by the pores. The sparingly soluble sulfonate-metal salt particles can traverse through pores of this size. An embodiment of the sparingly soluble sulfonate-metal salt particles has an average particle size diameter in a range of from about 50 nm to about 200 nm.

Anionic surfactant salts that are precipitated by different cations have different solution solubility, which affects the surfactant salt particle size and the amount of sulfonate surfactant in the aqueous solution. In other words, the free surfactant concentration in the formed surfactant solution can be regulated by the choice of the surfactant salt to introduce into the aqueous solution. Sparingly soluble surfactant-metal salt particles can be made smaller than 200 nm, smaller than 100 nm, or smaller than 50 nm.

The sulfonate-metal salt particles are sparingly soluble. A saturated solution of a sparingly soluble salt in water (solubility of less than $10^{-3}$ mol/L) may be considered to exist in a dynamic equilibrium of two opposing reactions. The dissolution of the solid salt and the crystallization of the salt are the two opposing reactions. When the rates of the two reactions are equal there is dynamic equilibrium. For example, when the sulfonate-metal salt has a solubility of 100 ppm in water, and 1.0 weight percent of sulfonate-metal salt is added in 1 liter of water, the sulfonate surfactant concentration in the aqueous solution is held constant at 100 ppm. Sulfonate-metal salt introduced into water releases sulfonate surfactant until the sulfonate surfactant in the aqueous solution achieves a concentration of 100 ppm, when a dynamic equilibrium forms between the sulfonate solution and the sulfonate-metal salt. An embodiment of the sparingly soluble sulfonate-metal salt particles has a solubility in a range of from about 50 parts-per-million (ppm) to about 300 ppm in water at room temperature. An embodiment of the sparingly soluble sulfonate-metal salt particles has a solubility in a range of from about 50 ppm to about 200 ppm in water at room temperature. An embodiment of the sparingly soluble sulfonate-metal salt particles has a solubility in a range of from about 50 ppm to about 100 ppm in water at room temperature.

A dispersion of sparingly soluble sulfonate-metal salt nanoparticles within an aqueous solution of sulfonate surfactant, when not in contact with a hydrocarbon, is in dynamic equilibrium. The replenishment of the sulfonate surfactant into the aqueous solution is driven by thermodynamic equilibrium between the solid, sparingly soluble surfactant-metal salt and the soluble surfactant in the aqueous solution.

The transport of the sulfonate surfactant from the surfactant-metal salt into the surfactant solution depends on the concentration of free surfactant already present in the solution, the equilibrium between the sparingly soluble surfactant-metal salt particles, and the rate of adsorption of free surfactant by present hydrocarbons. For example, if the sulfonate surfactant in solution is consumed upon contacting oil within a day, then another 100 ppm of sulfonate surfactant is replenished into the solution from the solid surfactant salt particles. In other words, the 100 ppm free surfactant concentration is maintained in the aqueous sulfonate solution by the presence of the sparingly soluble sulfonate-metal salt particles. The sparingly soluble sulfonate-metal salt particles contain sufficient amount of sulfonate surfactant to allow for sustained release from several hours to several days The aqueous solution in which the sparingly soluble sulfonate-metal salt particles is dispersed can range from de-ionized water to saline water, with salinity as high as 25 weight percent. The concentration of the sulfonate surfactant in the solution is dependent on the sparing solubility of the sulfonate-metal salt.

The combination of sparingly soluble sulfonate-metal salt nanoparticles within an aqueous solution of sulfonate surfactant or water is a dispersion. A dispersion consists of a fine insoluble or only slightly soluble particles distributed throughout a continuous medium. A "dispersion" is a two-phase system where one phase consists of finely divided particles (often in the colloidal size range) distributed throughout a bulk substance, the salt particles being the disperse or internal phase and the bulk substance the continuous or external phase. A dispersion is usually polydisperse—the dispersed salt particles usually have different sizes and shapes. A solid-in-liquid colloidal dispersion (loosely called solutions) can be precipitated. In the case of the sparingly soluble surfactant salts, the surfactant salts precipitate out of the solution. Larger particles will gradually coalesce and settle out.

The sparingly soluble surfactant-metal salt particle includes a metal ion salt of an anionic surfactant and a polymer. Useful metal ions include aluminum, calcium, magnesium, cobalt, zinc, barium, copper nitrate, and strontium. Useful anionic surfactants include alkyl sulfonates, alkyl aryl sulfonates, including dodecyl benzene sulfonate, alkyl aryl ether phosphates, alkyl ether phosphates, alky ether sulfates, and alkyl sulfates, and petroleum sulfonates. Useful polymers include partially hydrolyzed polyacrylamide, xanthan gum and polyvinyl pyrrolidone, hydrophobically modified hydrophilic polymers, including polymers made from monomers of dimethylaminoethyl methacrylate and cetyldimethylammoniumethyl methacrylate halide, polyvinyl acetate, polyvinyl alcohol and gelatins.

An embodiment of the sparingly soluble surfactant-metal salt particle includes the metal ion salt of an alkyl aryl sulfonate, the metal ion salt of a petroleum sulfonate and a hydrophobically modified hydrophilic polymer and has an average particle size diameter in a range of from about 50 nm to about 450 nm. An embodiment of the sparingly soluble surfactant-metal salt particle is where the petroleum sulfonate includes sulfonated benzenoid, cycloaliphatic, paraffinic hydrocarbons, and combinations thereof.

Method of Preparation

In an embodiment of the method of preparation of the sparingly soluble surfactant-metal salt particle, about 0.1 to about 2.0 weight percent of polymer is mixed with about 0.05 to about 5 weight percent of a metal ion salt at a temperature between about 0° C. and about 120° C. Examples of useful polymers include partially hydrolyzed polyacrylamide, xanthan gum and polyvinyl pyrrolidone. Examples of useful metal ion salts include aluminum nitrate nonahydrate, calcium chloride dihydrate, magnesium chloride hexahydrate, cobalt chloride hexahydrate, zinc chloride, barium chloride dihydrate, copper nitrate, and strontium chloride hexahydrate. To the polymer/salt mixture about 0.05 to about 5 weight percent of anionic surfactant is then added with vigorous stirring at temperatures about 0° C. and about 90° C. Examples of useful anionic surfactants include alkyl sulfonates, alkyl aryl sulfonates, alkyl aryl ether phosphates, alkyl ether phosphates, alky ether sulfates, and alkyl sulfates.

An additional example of a useful metal ion salt includes copper nitrate hemi(pentahydrate).

Additional examples of useful polymers include polyvinyl acetate, polyvinyl alcohol and gelatins. Another useful polymer is a hydrophobically modified hydrophilic polymer. An example of a commercially-available product that contains a hydrophobically modified hydrophilic polymer is HPT-1™ from Halliburton Energy Services. Although not intending to be bound by theory, it is believed that the hydrophobically modified hydrophilic polymer present in HPT-1 is a polymer formed from the monomers of dimethylaminoethyl methacrylate and cetyldimethylammoniumethyl methacrylate halide.

Alkyl sulfonates are primary and secondary paraffin sulfonates (PS and SAS) and α-olefin sulfonates (AOS). Alkyl aryl sulfonates include alkyl benzene sulfonates such as dodecyl benzene sulfonate, which is a linear alkyl benzene (LAB) sulfonate surfactant. The alkyl sulfonates and the alkyl aryl sulfonates do not include any other heteroatoms except for the sulfonate functional group.

Another example of a useful anionic surfactant is a sodium sulfonate that is prepared by treating a petroleum fraction, such as a heavy naphtha, lube oil, white oil or a vacuum distillation cut containing $C_{30-40}$ PNAs, with sulfur trioxide ($SO_3$). The resulting "petroleum sulfonate" is a mixture that can comprise sulfonated benzenoid (both alkyl aryl and aryl), cycloaliphatic and paraffinic (alkyl) hydrocarbons in various ratios to one another depending on the nature of the source petroleum fraction. Another benefit is that the produced petroleum sulfonate is both water and hydrocarbon soluble. An example of a commercially-available product that contains petroleum sulfonate is PETRONATE® EOR-2095 sodium sulfonate from Chemtura.

The size of the sparingly soluble surfactant-metal salt particle can be controlled by the addition rates of anionic surfactant and the metal salt while in aqueous solution. Since the oil reservoir pore sizes vary, a distribution of different particle sizes can be used accordingly to help oil recovery throughout a hydrocarbon-bearing formation. The sparingly soluble surfactant-metal salt particles can be polydisperse.

Process variables including temperature, flow rate of introduced reactants relative to the reactor volume, concentration of components, stirring rate in a batch reactor can all have an effect on controlling the particle size of the sparingly soluble surfactant-metal salt particle such that the average particle size diameter of about 50 nm to about 450 nm is achieved. For example, the attributes of the introduced aqueous solution of the metal ion salt affects the particle size of the sulfonated surfactant salt particle. An embodiment of the method of producing a sparingly soluble surfactant-metal salt particle includes where the metal ion salt concentration is in a range of from about 0.1 to about 20 wt. % of the aqueous solution containing the metal ion salt. Where the reactor has a fixed volume, an embodiment of the method includes where the aqueous solution containing the metal ion salt has a residence time in a range of from about 0.33 minutes to about 3 minutes in the reactor.

The attributes of the introduced aqueous solution containing the sulfonate surfactant and the polymer affects the particle size of the sulfonated surfactant salt particle. An embodiment of the method of producing a sparingly soluble surfactant-metal salt particle includes where the sulfonate surfactant is selected from the group consisting of an alkyl sulfonate, an alkyl aryl sulfonate, and combinations thereof. An embodiment of the method includes where the alkyl aryl sulfonate is dodecyl benzene sulfonate. An embodiment of the method includes where the sulfonate surfactant comprises a mixture of a petroleum sulfonate and dodecyl benzene sulfonate. An embodiment of the method includes where the polymer is selected from the group consisting of polyacrylamide, polyvinyl acetate, polyvinyl alcohol, xanthan gum, gelatins, a hydrophobically modified hydrophilic polymer, and combinations thereof. An embodiment of the method includes where the sulfonated surfactant salt particle comprises the metal ion salt of dodecyl benzene sulfonate, the metal ion salt of sulfonated petroleum and a hydrophobically modified hydrophilic polymer. An embodiment of the method includes where the sulfonate surfactant concentration is in a range of from about 0.1 to about 20 wt. % of the aqueous solution containing the sulfonate surfactant and the polymer. An embodiment of the method includes where the polymer concentration is in a range of from about 0.1 to about 20 wt. % of the aqueous solution containing the sulfonate surfactant and the polymer. Where the reactor has a fixed volume, an embodiment of the method includes where the solution containing the sulfonate surfactant and the polymer are introduced into the reactor such that the sulfonate surfactant and the polymer have a residence time in a range of from about 0.17 minutes to about 1.5 minutes in the reactor.

An embodiment of the method of producing a sparingly soluble surfactant-metal salt particle includes where the solution containing the sulfonate surfactant and the polymer is a non-aqueous solution.

An embodiment of the method of producing a sparingly soluble surfactant-metal salt particle includes where the reactor is operated such that a temperature is maintained in a range of from about 0° C. to about 95° C. during sparingly soluble surfactant-metal salt particle formation. An embodiment of the method includes where the reactor is a batch-type mixing reactor and the reactor is maintained at a mixing rate of 10 to 5,000 RPM during sulfonate surfactant salt particle formation. An embodiment of the method includes where the reactor is operated such that the sulfonated surfactant salt particle has an average particle size diameter in a range of from about 50 nm to about 200 nm.

In an embodiment of the method of preparation, between about 0.05 and about 5 weight percent a metal ion salt at temperatures about 0° C. and about 90° C. is added to about 0.05 to about 5 weight percent of alkyl sulfonate with vigorous stirring.

Method of Use

An embodiment of the method of treating a hydrocarbon containing formation includes introducing a slug of solution containing nano particles of surfactant salts, polymer and water into the reservoir. The slug is then followed by a water flood. The rates of the floods are adjusted such that an optimum amount of oil is recovered.

In an embodiment of the oil recovery operation, an aqueous dispersion consisting 0.05 to 5 weight percent of polymer, and 0.05 to 5 weight percent of the anionic surfactant salt particles with mean particle size less than 200 nm, is injected into an oil containing reservoir. The injected dispersion is then maintained in the reservoir for 1 hour to 1,000 hours. After the shut in period, the dispersion slug is followed by water flooding.

EXAMPLES

Examples of specific embodiments facilitate a better understanding of compositions and methods of forming sparingly soluble surfactant-metal salt particles and dispersions of sparingly soluble surfactant-metal salt particles in aqueous surfactant solutions useful for EOR. In no way should the Examples limit or define the scope of the invention.

To determine whether the precipitating anionic surfactant salt particle size for a given preparation is under 200 nm, the particle size is measured by Zetasizer, such as for example, one made by Malvern Instrument. The number averaged particle size of the anionic surfactant salt particles is determined from the sample.

The resulting salt dispersion is centrifuged and filtered. The supernatant sulfonate concentration in the supernatant is measured by the Total Carbon Analyzer.

Example 1

This example demonstrates that small particle size aluminum sulfonate salt can be prepared. Two ml of 0.3% partially hydrolyzed polyacrylamide was mixed with two mL of 1% aluminum nitrate nonahydrate at 0° C. Nineteen mL of 0.1 wt. % (1000 ppm) PETRONATE® EOR-2095 was then added with vigorous stirring. The resulting precipitate particle size was measured by the Zetasizer and number averaged particle size was determined to be 109 nm.

Example 2

This example demonstrates that small particle size calcium sulfonate salt can be prepared. This example is similar to Example 1, except that 1% calcium chloride dehydrate was used instead of aluminum nitrate nonahydrate. The resulting precipitate particle size was 73 nm.

Example 3

This example demonstrates that small particle size magnesium sulfonate salt can be prepared. This example is similar to Example 1, except that 1% magnesium chloride hexahydrate was used instead of aluminum nitrate nonahydrate. The resulting precipitate particle size was 62 nm.

Example 4

This example demonstrates that small particle size cobalt sulfonate salt can be prepared. This example is similar to Example 1, except that 1% cobalt chloride hexahydrate was used instead of aluminum nitrate nonahydrate. The resulting precipitate particle size was 87 nm.

Example 5

This example demonstrates that the free sulfonate concentration in the supernatant can be modulated by the presence of sulfonate salt. This example is similar to Example 1, except that no partially hydrolyzed polyacrylamide solution was added. The resulting salt dispersion was centrifuged and filtered. The supernatant sulfonate concentration in the supernatant was measured by the Total Carbon Analyzer. It was found that the supernatant contained 63 parts per million of sulfonate. In other words, initial surfactant concentration of 1,000 ppm was reduced to a constant free sulfonate concentration in the supernatant of 63 ppm.

Example 6

This example demonstrates that the free sulfonate concentration in the supernatant can be modulated by the presence of sulfonate salt. This example is similar to Example 5, except that calcium chloride dihydrate, instead of aluminum nitrate nonahydrate, was used. The resulting salt dispersion was centrifuged and filtered. The supernatant sulfonate concentration in the supernatant was measured by the Total Carbon Analyzer. It was found that the supernatant contained 83 parts per million of sulfonate. In other words, initial surfactant concentration of 1,000 ppm was reduced to a constant free sulfonate concentration in the supernatant of 83 ppm.

Example 7

This example demonstrates that the free sulfonate concentration in the supernatant can be modulated by the presence of sulfonate salt. This example is similar to Example 5, except that magnesium chloride hexahydrate, instead of aluminum nitrate nonahydrate, was used. The resulting salt dispersion was centrifuged and filtered. The supernatant sulfonate concentration in the supernatant was measured by the Total Carbon Analyzer. It was found that the supernatant contained 300 parts per million of sulfonate. In other words, initial surfactant concentration of 1,000 ppm was reduced to a constant free sulfonate concentration in the supernatant of 300 ppm.

Example 8

This example demonstrates that the free sulfonate concentration in the supernatant can be modulated by the presence of sulfonate salt. This example is similar to Example 5, except that cobalt chloride hexahydrate, instead of aluminum nitrate nonahydrate, was used. The resulting salt dispersion was centrifuged and filtered. The supernatant sulfonate concentration in the supernatant was measured by the Total Carbon Analyzer. It was found that the supernatant contained 106 parts per million of sulfonate. In other words, initial surfactant concentration of 1,000 ppm was reduced to a constant free sulfonate concentration in the supernatant of 106 ppm.

Example 9

Example 9 demonstrates that the particle size of the cobalt sulfonate salt can be controlled by the anionic sulfonate surfactant and by cobalt salt fluid introduction flow rates. A reactor containing 30 mL of water was stirred vigorously at room temperature. A 30 mL of 1 wt. % cobalt chloride hexahydrate aqueous solution was pumped into the reactor at a rate of about 10 mL/min. At the same time, a 60 mL non-aqueous solution containing 0.5 wt. % PETRONATE® EOR-2095 and 5 wt. % HPT-1™ was simultaneously pumped into the reactor at a rate of about 20 mL/min. The resulting average particle size diameter for the described run was determined to be about 232 nm. Table 1 summarizes the average cobalt sulfonate surfactant salt particle size as a function of three different introduction feed flow rates of the cobalt salt solution and the petroleum sulfonate surfactant solution. The cobalt sulfonate surfactant salt particle sizes were measured by a Field Flow Fractionation instrument (Model AF2000; Postnova; Germany).

TABLE 1

Cobalt ion and petroleum sulfonate solution flow rates, residence times and average cobalt sulfonate surfactant salt particle size for three given sets of feed flow rates.

| Co ion solution volume flow rate mL/min | Sulfonate surfactant sol'n volume flow rate mL/min | Co ion sol'n residence time min | Sulfonate surfactant sol'n residence time min | Average Co-sulfonate surfactant salt particle size diameter nm |
|---|---|---|---|---|
| 10 | 20 | 3 | 1.5 | 232 |
| 30 | 60 | 1 | 0.5 | 284 |
| 90 | 180 | 0.33 | 0.17 | 68 |

Example 10

Example 10 demonstrates that the particle size of the zinc sulfonate salt can be controlled by the anionic surfactant and the zinc salt fluid introduction flow rates. A reactor containing 30 mL of water was stirred vigorously at room temperature. A 30 mL of 1 wt. % zinc chloride aqueous solution was pumped into the reactor at a rate of about 10 mL/min. At the same time, a 60 mL non-aqueous solution containing 0.5 wt. % PETRONATE® EOR-2095 and 5 wt. % HPT-1 was simultaneously pumped into the reactor at a rate of about 20 mL/min. The resulting average particle size diameter for the described run was determined to be about 170 nm. Table 2 summarizes the average zinc sulfonate surfactant salt particle size as a function of three different introduction feed flow rates of the zinc salt solution and the petroleum sulfonate surfactant solution. The zinc sulfonate surfactant salt particle sizes were measured using the Field Flow Fractionation of Example 9.

TABLE 2

Zinc ion and petroleum sulfonate solution flow rates, residence times and average zinc sulfonate surfactant salt particle size for three given sets of feed flow rates.

| Zn ion solution volume flow rate mL/min | Sulfonate surfactant sol'n volume flow rate mL min | Zn ion sol'n residence time min | Sulfonate surfactant sol'n residence time min | Average Zn-sulfonate surfactant salt particle size diameter nm |
|---|---|---|---|---|
| 10 | 20 | 3 | 1.5 | 170 |
| 30 | 60 | 1 | 0.5 | 269 |
| 60 | 120 | 0.5 | 0.25 | 200 |

Example 11

Example 11 demonstrates that the particle size of the aluminum sulfonate salt can be controlled by the anionic surfactant and the aluminum salt fluid introduction flow rates. A reactor containing 30 mL of water was stirred vigorously at room temperature. A 30 mL of 1 wt. % aluminum nitrate nonahydrate aqueous solution was pumped into the reactor at a rate of about 10 mL/min. At the same time, a 60 mL non-aqueous solution containing 0.5 wt. % PETRONATE® EOR-2095 and 5 wt. % HPT-1 was simultaneously pumped into the reactor at a rate of about 20 mL/min. The resulting average particle size diameter for the described run was determined to be about 430 nm. Table 3 summarizes the average aluminum sulfonate surfactant salt particle size as a function of three different introduction feed flow rates of the aluminum salt solution and the petroleum sulfonate surfactant solution. The aluminum sulfonate surfactant salt particle sizes were measured using the Field Flow Fractionation of Example 9.

TABLE 3

Aluminum ion and petroleum sulfonate solution flow rates, residence times and average aluminum sulfonate surfactant salt particle size for three given sets of feed flow rates.

| Al ion solution volume flow rate mL/min | Sulfonate surfactant sol'n volume flow rate mL/min | Al ion sol'n residence time Min | Sulfonate surfactant sol'n residence time min | Average Al-sulfonate surfactant salt particle size diameter nm |
|---|---|---|---|---|
| 10 | 20 | 3 | 1.5 | 430 |
| 60 | 120 | 0.5 | 0.25 | 374 |
| 90 | 180 | 0.33 | 0.17 | 275 |

Example 12

Example 12 demonstrates that the particle size of the copper sulfonate salt can be controlled by the anionic surfactant and the copper salt fluid introduction flow rates. A reactor containing 30 mL of water was stirred vigorously at room temperature. A 30 mL of 1 wt. % copper nitrate hemi(pentahydrate) aqueous solution was pumped into the reactor at a rate of about 30 mL/min. At the same time, a 60 mL non-aqueous solution containing 0.5 wt. % PETRONATE® EOR-2095 and 5 wt. % HPT-1™ was simultaneously pumped into the reactor at a rate of about 20 mL/min. The resulting average particle size diameter for the described run was determined to be about 366 nm. Table 4 summarizes the average copper sulfonate surfactant salt particle size as a function of three different introduction feed flow rates of the copper salt solution and the petroleum sulfonate surfactant solution. The copper sulfonate surfactant salt particle sizes were measured using the Field Flow Fractionation of Example 9.

TABLE 4

Copper ion and petroleum sulfonate solution flow rates, residence times and average copper sulfonate surfactant salt particle size for three given sets of feed flow rates.

| Cu ion solution volume flow rate mL/min | Sulfonate surfactant sol'n volume flow rate mL/min | Cu ion sol'n residence time Min | Sulfonate surfactant sol'n residence time min | Average Cu-sulfonate surfactant salt particle size diameter nm |
|---|---|---|---|---|
| 30 | 60 | 1 | 0.5 | 366 |
| 60 | 120 | 0.5 | 0.25 | 219 |
| 90 | 180 | 0.33 | 0.17 | 199 |

What is claimed is:

1. A method of producing a sparingly soluble sulfonate-metal salt particle comprising the steps of:
   introducing an aqueous solution containing a metal ion salt into a reactor;
   introducing a non-aqueous solution containing a sulfonate surfactant and a polymer into the reactor, where the non-aqueous solution is introduced to the reactor with vigorous stirring of the aqueous solution; and
   operating the reactor such that the sparingly soluble sulfonate-metal salt particle forms from the interaction of the metal ion from the salt, the sulfonate surfactant and the polymer in an aqueous solution;

where the sparingly soluble sulfonate-metal salt particle has an average particle size diameter in a range of from about 50 nm to about 450 nm, and where the sparingly soluble sulfonate-metal salt particle is sparingly soluble in water at room temperature.

2. The method of claim 1 where the metal ion of the metal ion salt is selected from the group consisting of cobalt, zinc, aluminum, copper, and combinations thereof.

3. The method of claim 1 where the metal ion salt concentration is in a range of from about 0.1 to about 20 wt. % of the aqueous solution containing the metal ion salt.

4. The method of claim 1 where the reactor has a fixed volume and where the solution containing the metal ion salt is introduced such that the metal ion salt containing solution has a residence time in a range of from about 0.33 minutes to about 3 minutes in the reactor.

5. The method of claim 1 where the sulfonate surfactant is selected from the group consisting of an alkyl sulfonate, an alkyl aryl sulfonate, and combinations thereof.

6. The method of claim 5 where the alkyl aryl sulfonate comprises dodecyl benzene sulfonate.

7. The method of claim 1 where the sulfonate surfactant comprises a mixture of a petroleum sulfonate and dodecyl benzene sulfonate.

8. The method of claim 1 where the sulfonate surfactant concentration is in a range of from about 0.1 to about 20 wt. % of the aqueous solution containing the sulfonate surfactant and the polymer.

9. The method of claim 1 where the polymer is selected from the group consisting of polyacrylamide, polyvinyl acetate, polyvinyl alcohol, xanthan gum, gelatins, a hydrophobically modified hydrophilic polymer, and combinations thereof.

10. The method of claim 1 where the polymer concentration is in a range of from about 0.1 to about 20 wt. % of the aqueous solution containing the sulfonate surfactant and the polymer.

11. The method of claim 1 where the reactor has a fixed volume and where the solution containing the sulfonate surfactant and the polymer is introduced such that the sulfonate surfactant and the polymer solution has have a residence time in a range of from about 0.17 minutes to about 1.5 minutes in the reactor.

12. The method of claim 1 where the sparingly soluble sulfonate-metal salt particle comprises a metal ion salt of dodecyl benzene sulfonate, a metal ion salt of a sulfonated petroleum and a hydrophobically modified hydrophilic polymer.

13. The method of claim 1 where the sulfonated surfactant salt particle has an average particle size diameter in a range of from about 50 nm to about 200 nm.

* * * * *